April 22, 1969 F. N. CICCHIELLO 3,440,431

PHOTOELECTRIC CODE READING APPARATUS HAVING AUXILIARY LIGHT SOURCE FOR BIAS AND INCLUDING EDGE ILLUMINATED PLATE

Filed July 1, 1966

INVENTOR.
FRANK N. CICCHIELLO
BY Alfred Stapler
ATTORNEY 3,440,431
Patented Apr. 22, 1969

3,440,431

PHOTOELECTRIC CODE READING APPARATUS HAVING AUXILIARY LIGHT SOURCE FOR BIAS AND INCLUDING EDGE ILLUMINATED PLATE

Frank N. Cicchiello, Norristown, Pa., assignor to General Atronics Corporation, Wyndmoor, Pa., a corporation of Pennsylvania Filed July 1, 1966, Ser. No. 562,377
Int. Cl. G01n *21/30*
U.S. Cl. 250—219 10 Claims

ABSTRACT OF THE DISCLOSURE

Photoelectric code reading apparatus employing photosensitive elements to sense the passage of code markings is equipped with two separate sources of illumination. One source illuminates the code markings and, through light reflected therefrom, the photosensitive elements. The other, much weaker source, illuminates the photosensitive element directly, without relying on reflection from the code markings. The spectral characteristics of the sources are also different.

Figure 1:
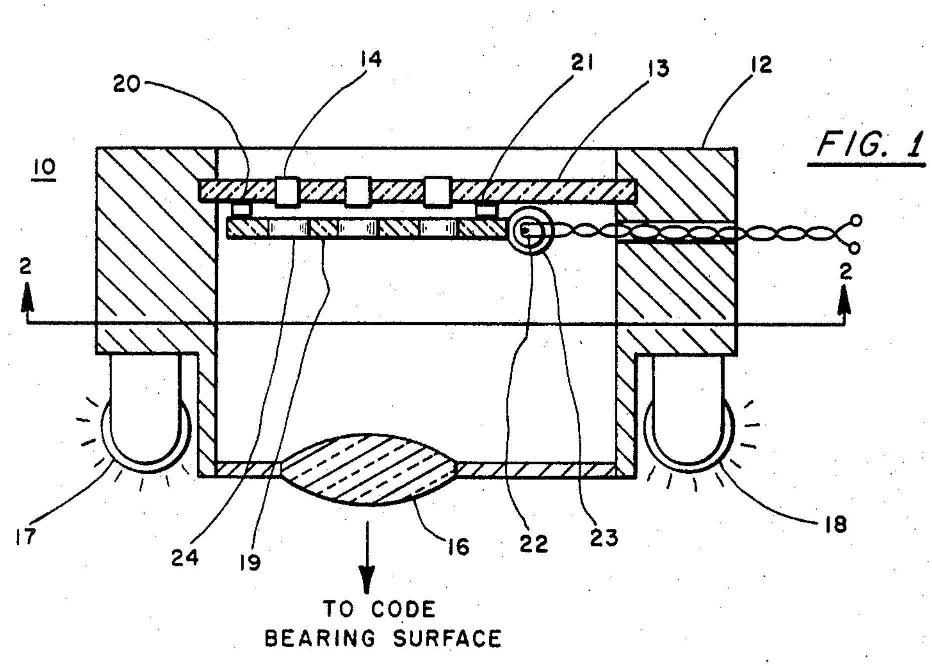

This invention relates to photoelectric code reading apparatus and particularly to apparatus for reading optical bar codes.

In many industrial situations it is desirable to read photoelectrically bar codes appearing on objects moving past the code reading apparatus. The code in question may consist, for example, of a pattern of printed line segments, or bars, appearing on each object in a color or shade contrasting with the background. The objects on which the bar code patterns appear may, for example, be paper labels bearing printed product information, as used on bottles containing drugs. The purpose of providing the bar code and of reading it photoelectrically is to permit automatic determination of the correctness of the product information appearing on the labels. In a practical case, such labels may be inspected for correctness before being applied to the drug containers by peeling them, one at a time, off the stack in which they are furnished and passing them serially by the photoelectric code reading apparatus. This apparatus is provided with photoelectric sensing elements, such as phototransistors, whose outputs vary in accordance with variations in light reflected toward them as the contrasting code bars and backgrounds of the labels pass near the code reading apparatus. The resulting variations in electrical signals produced by these photoelectric sensing elements are then processed by suitable electronic circuitry to permit the passage of the labels to continue so long as the code pattern representing the correct label is present, while interrupting the process and/or providing an alerting indication when a code pattern which does not correspond to the correct label is observed.

In order to have maximum utility, this type of code reading apparatus should be capable of producing wide variations in electrical output signal intensity in response to the passage of code bars before its respective photosensitive elements, even when these code bars are small, and even when the level of illumination is comparatively low. Moreover, the apparatus should be capable of responding effectively, i.e. with adequate variations in said electrical signal intensity, to a wide variety of relationships between the colors of the code bars and of the backgrounds on which these code bars appear. In order to be suitable for high speed operation, i.e. when the objects bearing the code bars move rapidly past the photoelectric sensing elements, it is further desirable to have the electrical output characteristics of the photoelectric sensing elements such as to be compatible with electrical circuits having response characteristics enabling them to deal with the high frequency electrical signals which occur when such rapid movement takes place. In addition, these electrical output characteristics should be as uniform as possible, from one such sensing element to another, in order to facilitate replacement and to minimize matching problems when more than one element is used simultaneously.

Prior to this invention, photoelectric code reading apparatus of the type here under consideration has been subject to significant limitations with respect to one or more of the desirable characteristics listed above.

It is, accordingly, a prime object of the invention to provide photoelectric code reading apparatus which is free from one or more of the above-mentioned limitations.

It is another object to provide photoelectric code reading apparatus which is capable of operating at comparatively low levels of illumination of the code bar pattern and its background.

It is another object of the invention to provide photoelectric code reading apparatus which is capable of distinguishing code bar patterns over a wide range of relationships between the colors of the code bars and those of the backgrounds on which they appear.

It is still another object of the invention to provide photoelectric code reading apparatus whose photoelectric sensing elements provide an output impedance which is suitably matched to the input impedance of electrical circuits to which their output signals are supplied.

It is still a further object of the invention to provide photoelectric code reading apparatus whose photoelectric sensing elements present an output impedance compatible with good high frequency response in the electrical circuits to which the output signals from these photoelectric sensing elements are supplied.

Still another object is to enhance the response uniformity as between different photosensitive elements.

These, and other objects of the invention which will appear, are achieved by providing the code reading apparatus with two illuminating means. One of these serves to illuminate the code bearing objects, as these pass by the code reading apparatus, thereby also providing the light which is reflected to the photoelectric sensing elements and to which these elements respond in order to provide the electrical output signals which indicate the presence or absence of the desired code patterns on said objects. The second illuminating means illuminates the photosensitive elements, preferably without reflection from code bearing objects passing by the code reading apparatus. This second, auxiliary illuminating means preferably utilizes an incandescent light source, while the first-mentioned main illuminating means preferably utilizes a fluorescent light source. Moreover the main illuminating means preferably provides an intensity of illumination which is much, e.g. several orders of magnitude, higher than that provided by the auxiliary illuminating means.

Figure 2:
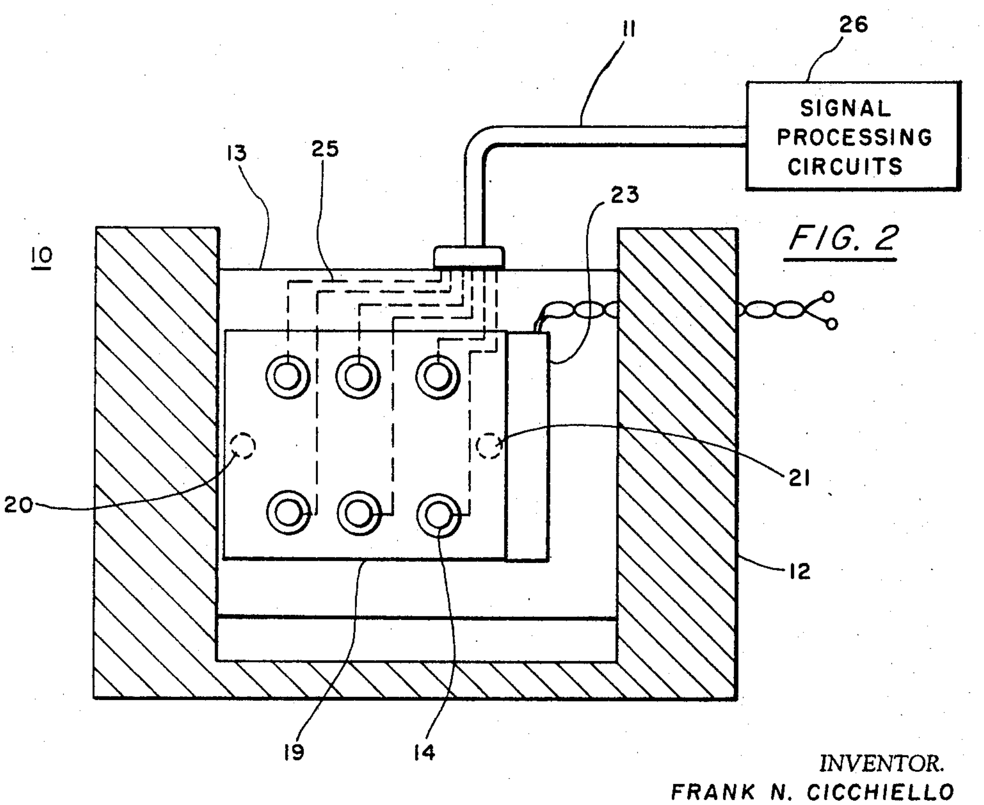

For further details reference may be had to the discussion which follows in the light of the accompanying drawings wherein FIGURE 1 is an elevation, partly in cross-section, of photoelectric code reading apparatus in accordance with this invention; and FIGURE 2 is a bottom sectional view of the apparatus of FIGURE 1, taken along section line 2—2 in FIGURE 1.

Referring now to the drawings, there is shown in both FIGURES 1 and 2 what is known as the "reading head" of the code reading apparatus. This reading head is denoted by reference numeral 10 in both figures. The reading head 10 includes, essentially, the optics of the photoelectric code reading apparatus; the electrical circuits used to process the electrical signals emanating from certain portions of the reading head 10 may be located elsewhere, and be electrically connected to the reading head 10 by cabling such as shown at 11 in FIGURE 2. The reading head 10 includes a box-like member 12, by which its various other components are supported. These other components include a plate 13 supported within a slot in the inner circumference of member 12 and preferably made of a translucent material, such as glass which is frosted on the lower surface. Photosensitive elements 14 are supported in holes within plate 13. These photosensitive elements, which are preferably phototransistors, are preferably positioned so that their effective light sensitive surfaces are in substantially the same plane as the frosted surface of plate 13. Six such photosensitive elements are shown in this typical arrangement, of which three are visible in the elevation of FIGURE 1. The pattern in which these photosensitive elements 14 are arranged depends upon the particular bar code pattern to be detected, and also upon the particular processing operations to which the electrical output signals from these photosensitive elements 14 are to be subjected in the course of the over-all code reading operation. It should be noted that the instant invention is not dependent on any particular geometrical arrangement of the photosensitive elements or on the performance of any particular signal processing operation.

At the narrow end of member 12 there is supported a lens system diagrammatically illustrated by a single lens 16, but which, it will be understood, may consist of more complex lens configurations. The entire code reading head 10 is oriented, when in use, so that the lens system 16 is placed close to the path followed by the objects (not shown) which bear the code patterns to be viewed by the reading head. Thus an image of this bar code pattern is projected through the lens system 16 upon the surface of plate 13 confronting the lens system 16.

Also attached to member 12 are lamps 17 and 18 which serve to illuminate the code pattern bearing objects as they move past code reading head 10. As is apparent from FIGURE 1, these lamps are preferably so placed that their light reaches lens system 16 only indirectly, through reflection from the code bearing objects passing by the lens system.

In addition, in accordance with the present invention, an auxiliary plate 19 is provided between the lens system 16 and the plate 13 carrying the photosensitive elements 14. This auxiliary plate may be supported directly upon plate 13, as for example through mounting discs 20 and 21 to which both plates 13 and 19 are cemented. Plate 19, which is translucent at least in a direction parallel to its plane surfaces, is illuminated in such a way that the light which illuminates it remains substantially confined between the top and bottom surfaces of the plate. This may be accomplished by lighting the plate 19 with lamp 22, which is preferably placed within an opaque housing 23 surrounding lamp 22 on all sides except on that confronting plate 19 and thereby shielding other portions of the apparatus from the light shed by lamp 22.

Alternatively, a similar lamp may be mounted on one face of plate 19 and its light directed toward the plate at such a grazing angle that it tends not to re-emerge from that plate but to remain trapped between its top and bottom surfaces.

Discontinuities are provided in plate 19 for the purpose of creating therein local sources of illumination stemming from the edge-lighting effect of lamp 22. For example, these discontinuities may be in the form of holes drilled in plate 19 opposite each photosensitive element 14. These holes are preferably drilled so as to have slightly roughened side walls, which will glow when lamp 22 is turned on. This glow in the walls of each hole in plate 19 will be observed by the photosensitive element 14 lined up with that particular hole.

Each photosensitive element 14 is connected to the cable 11, through which suitable energizing voltages are applied to the photocells and their respective output signals are supplied to suitable electrical circuits 26, wherein variations in these output signals created by the passage of code bars in front of lens system 16 are processed in suitable manner to form the desired signal indicative of the presence or absence of the desired pattern of code bars. The above-mentioned connections, which may be plated directly on the top surface of plate 13, are diagrammatically represented by broken lines 25 in FIGURE 2. Since circuits 26 may take any one of a variety of conventional forms, and since their particular form is not pertinent to the above present invention, they are not described in detail herein.

Suffice it to say that these circuits preferably have input impedances which are not in excess of the order of 100,000 ohms. This is desirable in order to permit them to operate with stability in the face of variations in the ambient temperature of the medium within which they are located, and also in order that they be capable of processing high frequency variations in the signals from the photosensitive elements such as occur when the code bar patterns move past the reading head at high speeds. For optimum electrical power transfer from the photosensitive elements 14 to circuits 26 it is desirable that the photosensitive elements 14 have output impedances which do not greatly exceed the input impedances of those mentioned above. The lamps 17 and 18 which provide the main illumination for the code bar patterns, and which therefore also constitute the source of light reflected back to the photosensitive elements 14 via lens system 16, preferably have strong spectral components distributed in various locations within the visible spectrum, and particularly one or more such components in the bluish region of said spectrum. This appears to be conducive to producing light reflections leading to strongly contrasting electrical output signals from a wide variety of combinations of code bar and background colors. For example, fluorescent lamps of the type known as "cool white" are particularly suitable for use as lamps 17 and 18.

It has been found that the output impedance of practical photosensitive elements, such as phototransistors, greatly exceeds the desirable low values mentioned above when illuminated by reflected light emanating from "cool white" fluorescent lamps. This is so particularly when the intensity of the light emitted by the lamps is kept within reasonable bounds, considering the sizes of the lamps and their proximity to the code bearing objects.

Auxiliary lamp 22, on the other hand, is chosen so as to provide light having a spectral distribution approximating that provided by incandescent lamps. Under such illumination, the output impedance of the photosensitive elements 14 assume an output impedance which is much lower than in the absence of such illumination.

As a result, the output impedance of the photosensitive elements more nearly approximate the value providing a suitable match to the input impedance of the electrical circuits 26, thereby improving the transfer of variations in the output signals corresponding to code bar passage and also the high frequency response necessary for high speed operation. In addition, the temperature stability of the equipment is improved, and the ability of the equipment to operate with many different combinations of code bar and background colors is enhanced, and the uniformity of response as between different photosensitive elements is increased.

It will be understood that the invention is not limited to the reading of codes on labels, but may be applied irrespective of the nature of the object bearing the code, and irrespective of the nature of the code. Indeed, it may be applied whenever the effects on photosensitive elements which it produces are desirable, even where no code reading operation at all is involved.

In its application to code reading, an arrangement which has been found satisfactory includes main lamps of the "cool white" fluorescent type available from Aristo Grid Lamp Products, Inc., an auxiliary lamp Model CM 8–666 obtainable from Chicago Miniature Lamp Co., and General Sensors, Inc. phototransistors Model GS–100. Care must be taken not to saturate the phototransistors by too intense illumination from the auxiliary lamp. Excitation of that lamp by 60 ma. of current has been found satisfactory for certain specific arrangements of the above elements.

It will be understood that many variations in the specific arrangement described above are possible without departing from the scope of the invention. For example, plate 13, which is preferably provided with a light diffusing surface confronting lens system 16, in order to make it possible to visually focus the images of the code bars passing by the reading, may alternatively be constructed in other ways. Likewise, the edge-lighting of plate 19 may be accomplished in various ways. In fact, in lieu of edge lighting, provision may be made for illuminating each element 14 separately with an auxiliary lamp of characteristics similar to those of lamp 22. Also, various well known means for electrically energizing the lamps and the photosensitive elements may be utilized.

In view of all the above, it is desired that the scope of this invention be limited only by the appended claims.

I claim:

1. Photoelectric code reading apparatus comprising: photoelectric sensing means responsive to light reflected from a code pattern; means for illuminating said code pattern; and auxiliary means for illuminating said sensing means with light having different spectral characteristic than the light illuminating said pattern, whereby said sensing means is biased into conduction independently of the light reflected from the code pattern.

2. The apparatus of claim 1 characterized in that said auxiliary means illuminates said sensing means substantially without reflection from said pattern.

3. The apparatus of claim 1 characterized in that said auxiliary means produces light of much lesser intensity than said code pattern illuminating means.

4. The apparatus of claim 1 characterized in that said auxiliary means produces light having spectral characteristics approximating those of incandescent light.

5. The apparatus of claim 4 further characterized in that said code pattern illuminating means produces light having strong spectral components distributed in various locations within the visible spectrum.

6. The apparatus of claim 5 characterized in that said auxiliary means is an incandescent light source and said code pattern illuminating means is a fluorescent light source.

7. The apparatus of claim 6 characterized in that said fluorescent light source is of the type known as "cool white."

8. The apparatus of claim 1 further characterized in that said auxiliary means comprises a light source, a transparent plate edge-lighted by said source and disposed in the path of said light reflected from said code pattern, and means in said plate for directing light from said source to said sensing means.

9. The apparatus of claim 8 characterized in that said light directing means comprises at least one aperture in said transparent plate having rough edges which glow in response to light from said source.

10. The apparatus of claim 9 characterized in that said sensing means includes a plurality of phototransistors and said plate has one said aperture for each said phototransistor.

References Cited

UNITED STATES PATENTS 2,899,132 8/1959 Orthuber ----------- 250—226

RALPH G. NILSON, *Primary Examiner.*

U.S. Cl. X.R.

250—226